United States Patent [19]

Williams

[11] 4,051,721

[45] Oct. 4, 1977

[54] CAPACITIVE FORCE-MEASURING SYSTEM

[75] Inventor: Richard E. Williams, Reston, Va.

[73] Assignee: Scope Incorporated, Reston, Va.

[21] Appl. No.: 648,757

[22] Filed: Jan. 13, 1976

[51] Int. Cl.² .............................................. G01L 1/14
[52] U.S. Cl. .............................. 73/141 A; 324/61 QS
[58] Field of Search ............ 73/141 R, 141 A, 398 C, 73/517 R; 324/61 QS; 340/200; 317/246

[56] References Cited

U.S. PATENT DOCUMENTS

| | | | |
|---|---|---|---|
| 2,917,300 | 12/1959 | Spiess | 73/517 R X |
| 3,280,628 | 10/1966 | Schloss | 73/398 C X |
| 3,541,849 | 11/1970 | Corbett | 73/141 |
| 3,729,991 | 5/1973 | Hardway | 340/200 X |

Primary Examiner—James J. Gill
Attorney, Agent, or Firm—John E. Benoit

[57] ABSTRACT

An applied force whose magnitude is to be measured is caused to change the spacing between a pair of conductive plates. The resulting variation in capacitance between the plates is employed in an RC oscillator circuit so as to produce a frequency that is reciprocally related to the capacitance. A neutralizing circuit serves to cancel the effect of stray capacitance, and a digital counting device converts the oscillator frequency to a scaled number indicating the magnitude of the applied force.

7 Claims, 6 Drawing Figures

CAPACITIVE FORCE-MEASURING SYSTEM

This invention relates generally to capacitive force-measuring systems and more specifically to a capacitive system exhibiting high resolution and linearity.

A capacitive load cell or force-measuring sensor offers desirable characteristics of simplicity and low cost. Such devices have not become widely used in applications requiring high resolution and linearity, however, because it has been difficult to translate capacitor plate motion into an electrical signal form precisely and linearly related to a force producing that motion. The dominant source of non-linearity is due to inevitable stray capacity either within the cell or external to it as produced by lead dress, earth grounds, etc. Other sources of non-linearity result from stray electrostatic perturbations, awkward mathematical relationships between capacitive charge and time or frequency, and the difficulty of obtaining a large capacitance variation in a simple assembly.

Partial solutions to date have included the use of bridge arrangements in which a a number of adjustments are required for each measurement, limited-range heterodyne frequency techniques similarly requiring careful adjustment, and non-linear calibration methods sometimes involving the nulling of counter forces in the load cell. The complexities of such methods have prevented the development of an easily mass-produced, highly precise capacitive force sensor for applications such as weighing, measuring gas or liquid pressures, detecting accelerations, etc.

Accordingly, it is an object of this invention to overcome the above discussed disadvantages of capacitive force-measuring systems by providing a capacitive load cell whose capacitance varies in a reciprocal relationship to an applied force and connecting said capacitor to a circuit capable of producing an output frequency that is also related to the reciprocal of the capacitance.

Another object of the invention is to provide simple means for averaging a large number of capacitance charge cycles so as to minimize deleterious effects of random electrical perturbations.

Another object of the invention is to provide a novel device for cancelling non-linearity due to stray capacitances.

Still another object of the invention is to provide digital counting means which serve to convert a frequency representative of an applied force into a display form scaled directly in force units.

Yet another object of this invention is to provide a means for digitally removing undesired force offset indications from an output display or processor.

The foregoing and other objects, features and advantages of the invention will be apparent from the following more particular description of preferred embodiments of the invention, as illustrated in the accompanying drawing in which.

Figure 1:
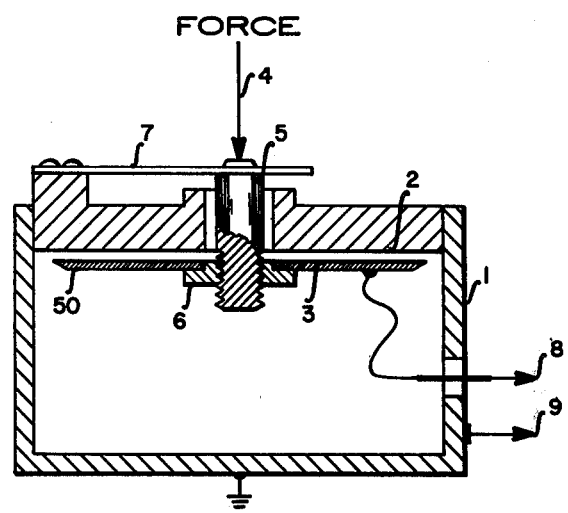
FIG. 1 is a cross-section view of a capacitive load cell according to the present invention.

The capacitive sensor element of FIG. 1 is comprised of a conductive shield 1 electrically connected to a conductive surface 2 which serves as one plate of a capacitor. A second conductive surface 3 in reasonably close proximity to the first surface 2 is caused to vary in that proximity by a force applied in the vector direction 4. The force is transmitted by the shaft 5 and an adjustable insulating sleeve 6 to a plate 50 carrying the surface 3. A spring support 7 serves to supply a neutral or restoring force, and assuming that the applied force or stress is well within the yield strength of the spring 7, Hooke's Law will prevail and the distance between surfaces 3 and 2 will be linearly proportional to the applied force.

A formula for the capacity produced by a pair of conductive surfaces deployed as in FIG. 1 is of the form $C = kA/d$ where $C$ is the capacity, $k$ is a constant related to the dielectric constant of air, $A$ is the effective area of a single surface, and $d$ is the distance between surfaces. Thus, as force is exerted downward in FIG. 1 the distance between surfaces, $d$ increases and the capacitance decreases. In this fashion, the resulting capacitance is reciprocally related to the applied force when the force is in the downward direction of FIG. 1; i.e., an increase in force produces a decrease in capacitance. The capacitance is measured across leads 8 and 9. Lead 9 is connected to the outer wall of the electrical shield 1 and also serves as electrical ground. The configuration of FIG. 1 thus provides excellent electrostatic shielding since outer surfaces are predominantly at ground potential.

Figure 2:
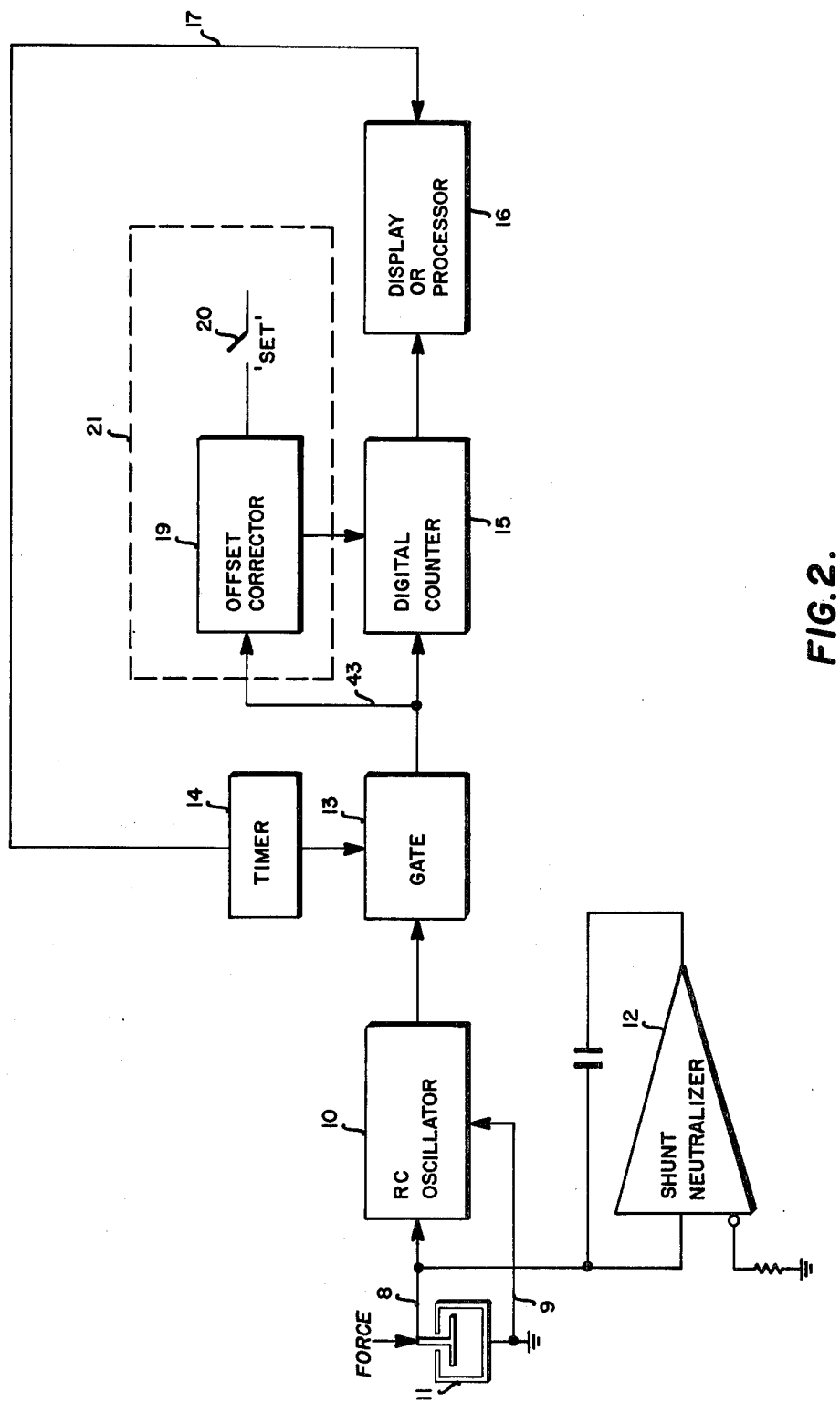
FIG. 2 is a block diagram of the major elements of a system utilizing the load cell illustrated in FIG. 1.

Assuming that force is considered increasing in the downward direction of FIG. 1, the output busses 8 and 9 can be connected to a resistance-capacitance (RC) oscillator 10 of FIG. 2 so that an increasing force produces a higher output frequency. Unlike oscillators employing inductances, RC oscillators typically produce output frequencies reciprocally related to first-order values of their tuning capacitances. Accordingly, the basic relationship between the applied force and the RC oscillator output frequency of FIG. 2 is linear. In practice, inevitable stray or shunt capacities effectively across busses 8 and 9 will introduce non-linearity because shunt components become a larger portion of total capacitance within the load cell 11 of FIG. 2 becomes smaller. The result is that large forces will produce frequencies somewhat lower than the perfectly linear case would dictate.

The system of FIG. 2 will first be described in a general functional manner so that novel features of the invention will become apparent. Detailed circuit descriptions of preferred embodiments will later be provided.

The capacitive cell 11 is connected to a novel shunt neutralizer 12 which serves to introduce a current into buss 8 that precisely cancels the effect of stray capacity without affecting the signal produced by the cell 11. Neutralizer 12 thus serves to restore a linear frequency-to-force relationship.

The frequency at the output of RC oscillator 10 with the aforesaid neutralization is linearly and precisely related to the applied force, and is applied to a gate 13 whose duration has been accurately set by a stabilized timer 14. For purposes of exposition, assume that a force of one pound applied to cell 11 produces a frequency at the output of RC oscillator 10 of 100 kHz. If gate 13 is set to a duration of one second by timer 14, exactly 100,000 pulses will be observed at the gate output during one gate period. A digital counter 15 connected to a display 16 converts the pulse count into an appropriate binary, decimal or other format suitable for display or processing. The resulting reading can be stored if desired by means of a latch strobe on buss 17. By proper choice of gate duration, oscillator frequency, and display characteristics, the output display can be scaled to read directly in units of applied force whether they be pounds, grams, newtons, etc.

An offset corrector 19 coupled to "Set" switch 20 can in one embodiment serve to inhibit digital counter 15 for a number of frequency pulses corresponding to a quiescent or offset force applied to the load cell 11. Such a force could correspond to a tare setting in a weighing application, static liquid pressure in a liquid measurement, etc. The elements within the dashed zone 21 are needed only if such offset digital subtraction is desired.

The elements of FIG. 2 following the RC oscillator 10 operate digitally and, in the case of elements 15 and 16, can be purchased commercially. Since novelty resides in the operation of the shunt neutralizer 12 and the capacitance-to-digital translation intrinsic to the operation of RC oscillator 10 and gate 13 those circuits will next be described in greater detail.

Figure 3:
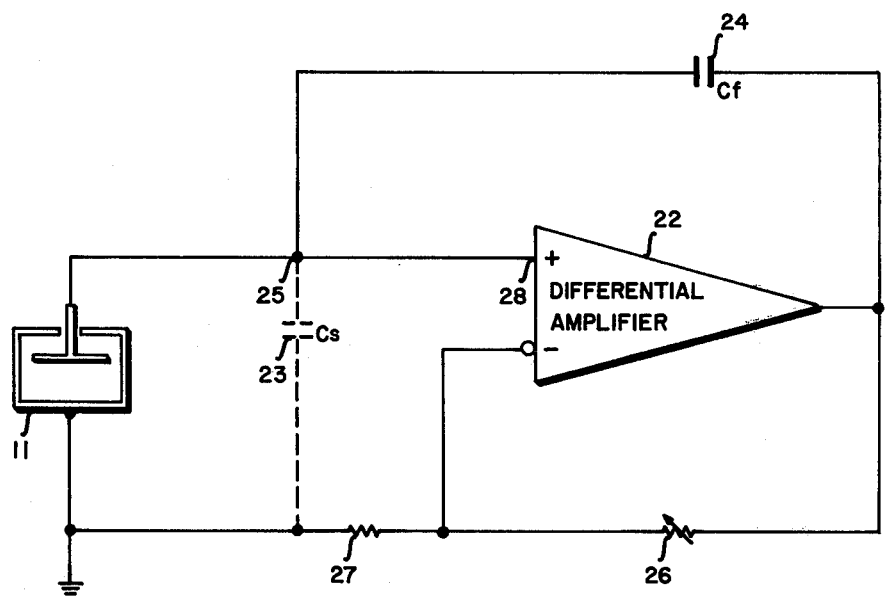
FIG. 3 is a circuit diagram of the shunt neutralizer utilized in the system illustrated in FIG. 2.

With reference to FIG. 3 the shunt neutralizer 12 of FIG. 2 is comprised of a gain-stabilized differential amplifier 22 shunted directly across the load cell 11. Stray capacity 23, shown dotted, inevitably shunts the output of cell 11 to cause the aforementioned non-linearity, particularly at low load-cell capacitances. Typical values of force-dependent load-cell capacitance may range from tens to hundreds of picofarads as force is varied. Stray capacitance typically is static and ranges from 10 to 50 pF depending upon the detailed lead dress, etc. Feedback capacitor 24 is connected from the output of amplifier 22 ot its non-inverting input, producing positive feedback. It can mathematically be shown that if amplifier 22 has a voltage gain G, the current introduced into junction 25 by feedback capacitor 24 exactly compensates the current in stray capacity 23 when the value of capacity 24 multiplied by (G − 1) equals the value of shunt capacity 23. When no net current appears at the junction 25, the capacitive load cell 11 sees no loading whatsoever, and the non-linearity introduced by the shunt capacitance 23 is eliminated. Although such positive feedback normally would cause oscillation, the additional capacity imposed by the load cell reduces the net loop gain to less than unity. The circuit is thus stable when the load cell is connected.

The aforementioned mathematical relationship, $C_f(G - 1) = C_s$, can be realized through choice of feedback capacitor 24 and differential amplifier voltage gain G. As an example, if the stray capacity 23 is 20 pF and differential amplifier 22 gain is set to precisely 1.5, the feedback capacitor 24 should be 40 pF for complete cancelation. Typical gains, G, tend to lie between one and two— a condition that leads to excellent basic amplifier stability.

Negative feedback resistances 26 and 26 can be used to precisely and stably set the gain of amplifier 22. By making any one of the three elements 24, 26, or 27 adjustable, the mathematical relationship leading to complete capacitor neutralization can be realized. For reasons well understood in differential amplifier art, the establishment of low gain via the feedback technique using resistors 26 and 27 is accompanied by an increase in the apparent D.C. input impedance at the non-inverting input 28 of the amplifier. The circuit of FIG. 3 accordingly exhibits th desirable characteristics of high stability, very high D.C. input impedance, simplicity, and complete stray capacity neutralization.

When the neutralizer of FIG. 3 is impressed across the load cell 11, the apparent capacity as seen at junction 25 precisely varies as the reciprocal of applied force. The RC oscillator of FIG. 4 produces an output frequency reciprocally related to capacitance, and thus will produce an output frequency linearly related to applied force. A tuned oscillator to the LC type, on the other hand, would produce an output frequency that would vary as the reciprocal of the square root of C and thus exhibit a corresponding non-linear relationship to applied force. The RC oscillator of FIG. 4 exhibits excellent stability and immunity to supply voltage variations while maintaining the desired linearity. Upon application of supply potential, switch control 29 sets switch 30 to one of its two states. Assume that switch 30 is set clockwise so that a positive potential is connected to buss 31. The capacitance of load cell 11 is charged via resistance 32 toward the positive potential so as to produce a rising potential at junction 33 as graphically displayed via 40 of FIG. 5. The potential at junction 33 rises linearly until the inverting input of comparator 34 exceeds the fixed positive potential at its non-inverting input established by resistors 35 and 36. The time consumed in reaching the theshold is directly related to the value of load cell capacitance 11.

When the threshold is reached, the output of comparator 34 goes low, resetting switch control 29 and causing switch 30 to connect buss 31 to a negative potential. The action then follows the graphic segment 41 of FIG. 5 during which load cell capacitance 11 discharges toward a negative potential via resistance 32. Junction 33 follows the discharge path until the non-inverting input of comparator 37 falls below the negative potential imposed upon the inverting input via resistors 38 and 39. When the threshold is reached comparator 37 output goes low causing switch control 29 to reactivate the entire cycle.

Figure 4:
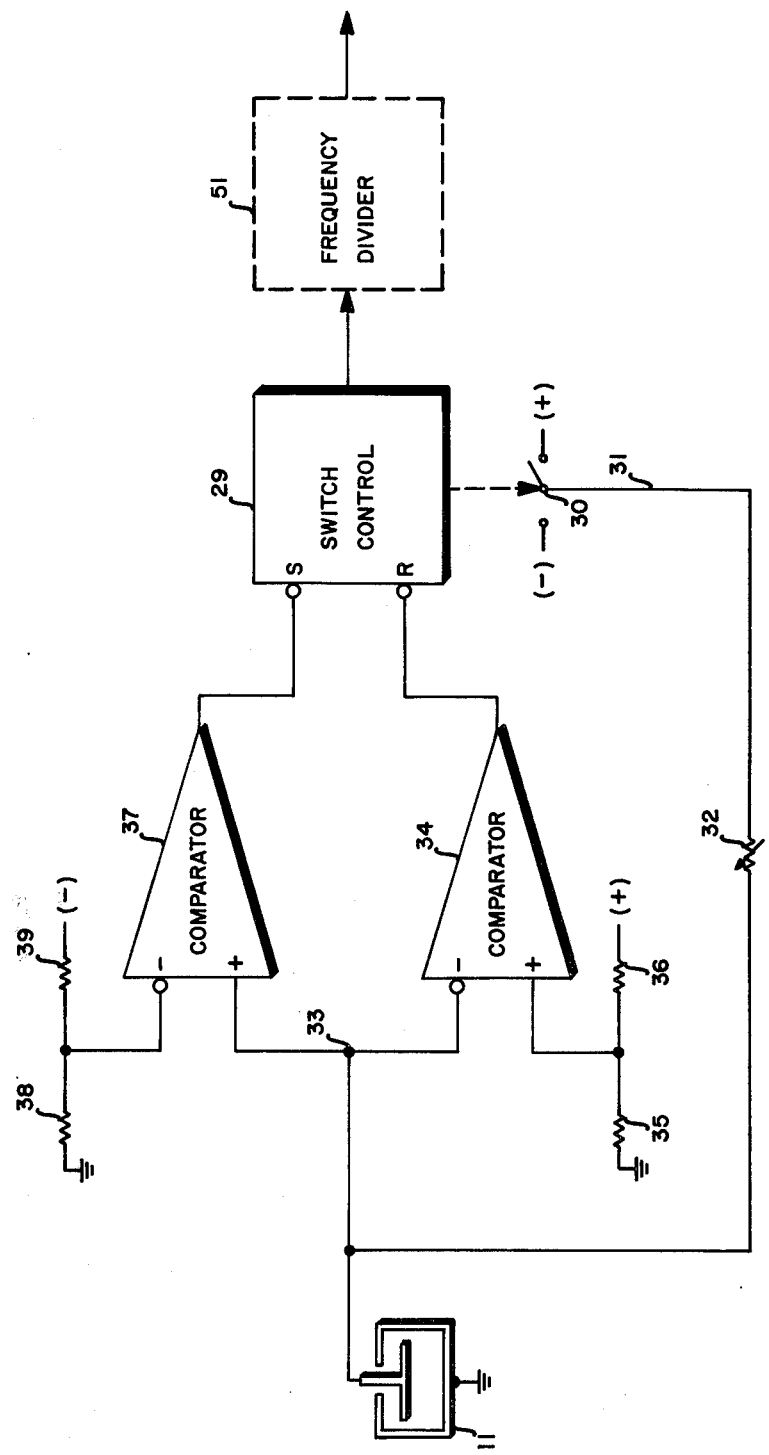
FIG. 4 is a circuit diagram of an RC oscillator suitable for utilization in the system illustrated in FIG. 2.
Figure 5:
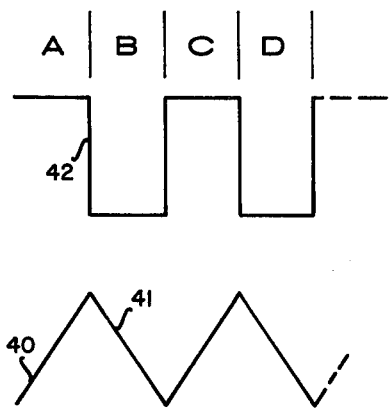
FIG. 5 is a graphic representation of waveforms of the circuit illustrated in FIG. 4.

The output from switch control 29 is comprised of rectangular waveform 42 of FIG. 5. Although a simple switch 30 is shown for ease of exposition, the switching in a preferred embodiment is done electronically through use of a switching transistor. Since the charge and discharge of load cell capacitance 11 are toward positive and negative potentials that are also used to derive the thresholds for comparators 34 and 37, the circuit shown is relatively immune to variations in supply potentials. Accordingly, the output frequency produced by the oscillator of FIG. 4 is quite precisely related to the reciprocal of load cell capacitance 11 and therefore to the applied force.

Short-term perturbations such as noise spikes and random threshold-affecting phenomena are largely overcome through the direct capacitance to frequency conversion. The frequency is measured and averaged over thousands of cycles by means of a simple sampling gate and digital counter. Accordingly, individual segments 40 and 41 can depart randomly from the average without appreciably affecting the ensemble measurement.

A frequency divider 51 can be appended to the oscillator output to provide an output frequency span suitable for subsequent processing. The divider 51 is commercially available as one or more flip-flop stages.

Returning to FIG. 2, when the RC oscillator 10 output frequency is gated for a precise time interval by gate 13 which may take the form of a logical NAND element or similar device, the output count which is directly related to frequency is also directly related to the applied force. With zero applied force, it is normally desirable to have a zero output count. In one embodiment this is accommodated by setting the frequency of the RC oscillator 10 to produce a precise overflow count or an integral multiple thereof at digital counter 15 with no input force applied. For example, assume that the digital counter 15 can handle a decimal count range from zero through 999. Through adjustment of RC oscillator 10 or timer 14 a total of 1,000 counts can be produced at the output of gate 13 with no force applied to the cell 11. During the gate interval the digital counter thus runs through 999 plus 1 count, and ends in a zero state. The display 16 would thus register "zero". Intergral multiples of the overflow count will also suffice. Zero-force counts that would be acceptable in the example include 1,000 2,000, 3,000 etc. Each will leave a residue of zero in the digital counter.

When the load cell capacitance is adjusted via sleeve 6 of FIG. 1, for example, so that the ratio of maximum to minimum capacitance is $(N + 1)/N$, where N is any integer, adjustment of resistor 32 in oscillator 10 can provide the "zero" and also a desired span of output readings. For example, assume that the maximum force to be measured is 999 pounds. The load cell structure of FIG. 1 can be adjusted to halve in capacitance ($N = 1$) over a 1,000 pound force range. The capacitance halving corresponds to a frequency doubling out of the RC oscillator 10. Assuming that the gate 13 duration has been set to 1 second, it is merely necessary to adjust the oscillator 10 frequency to 1,000 Hz at zero force by setting resistance 32 of FIG. 4. Again assuming a digital counter overflow of decimal 1,000, the zero force would register "zero". A 1,000-pound force would then produce a frequency of 2,000 Hz which again just overflows the counter. Forces from zero through 999 pounds would register exactly the proper counts since they would be responsive to frequencies categorized by a zero count modulo M, such as from 1,000 to 1,999 Hz, or zero to 999 module 1,000. It is obvious that time 14 can be adjusted instead of resistance 32 to obtain the same result if desired. The invention is thus able to produce properly scaled digital outputs by mere adjustment of the sleeve 6 timing and circuits associated with RC oscillator 10 or timer 14.

In a preferred embodiment, timer 14 is comprised of a stable frequency source such as a crystal oscillator with appropriate frequency dividing circuits suitable for turning gate 13 on and off for a desired interval. Since such circuits are completely conventional and well-described in the literature, they are not described in detail herein.

Figure 6:
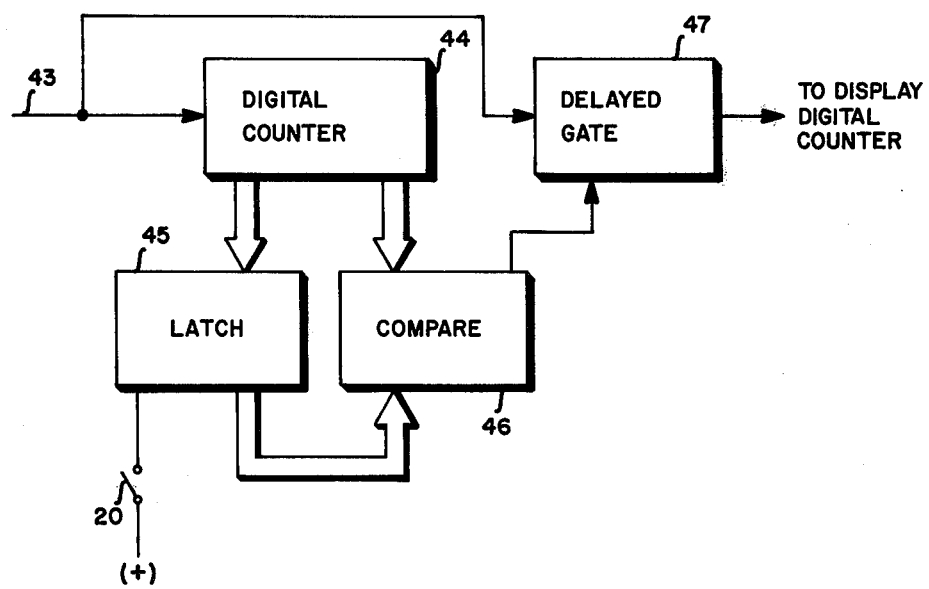
FIG. 6 is a circuit diagram of the offset corrector utilized in the system illustrated in FIG. 2.

Whereas the adjustments sleeve 6, RC oscillator 10, and the duration of the interval determined by gate 13 determine the scaling of the output relative to applied force, the nullification of an offset force is fundamentally a digital subtraction process. In essence, the magnitude of the force to be offset is substracted from the force actually measured. A preferred embodiment for implementing the subtraction in simple form in shown in FIG. 6. Pulses traveling through gate 13 of FIG. 2 are applied via buss 43 to auxiliary digital counter 44 of FIG. 6. When only the offset or quiescent force is present at the load cell 11 of FIG. 2, "Set" switch 20 FIG. 2 and FIG. 6 is actuated. The actuation causes the digital count corresponding to the quiescent force to be stored in latch 45 of FIG. 6. Latch 45 comprises the memory of the offset in digital form. When the offset has been stored, switch 20 is deactivated and latch 45 retains the stored count. When a subsequent force is measured, digital counter 15 of FIG. 2 is inhibited from counting until a count equivalent to that stored in the latch 45 has been accrued. That condition is signaled by an output from compare 46 of FIG. 6. Delayed gate 47 serves to actuate digital counter 15 of FIG. 2 to enable a residue count corresponding to applied force in excess of the offset. The display or processor 16 of FIG. 2 thus will register incremental forces from which the quiescent force has been removed. By this means, in a weighing process for example, the weight of a container can be automatically subtracted from the combination of container and contents.

The offset corrector 21 of FIG. 2 can also be employed to establish a desired span of output indications in lieu of the capacitance-integral-ratio method described above. It can mathematically be shown that adjustment of resistor 32 of FIG. 4 can establish a desired frequency increment, or difference, as the load cell capacitance is moved between values imparted by zero and maximum forces, respectively. In some cases the frequency divider 51 may have to be appended to the oscillator to attain the desired increment. Actuation of "Set" switch 20 with zero applied force creates an output indication of "zero" for that force regardless of resistor 32 setting. When a maximum force is then applied, resistor 32 can be adjusted to control the count through delayed gate 47. The count is brought close to the desired indication. The force is then reduced to zero, switch 20 once again actuated, and the entire process repeated. The frequency increment is eventually converged to the desired span by the iterative process. The final value of resistor 32 is then proper for the span and need not be readjusted despite changes in offset. While the invention has been particularly shown and described with reference to preferred embodiments thereof, it will be understood by those skilled in the art, that various changes in form and details may be made therein without departing from the spirit and scope of the invention.

I claim:

1. A system for measuring force comprising:
    first means for producing electrical capacitance reciprocally responsive to said force including an electrical phase and amplitude positive feedback device for neutralizing stray capacitance;
    a resistance-capacitance oscillator responsive to said first means for generating an alternating electrical signal whose frequency is reciprocally responsive to said capacitance;
    second means responsive to the output of said oscillator for generating a signal indicative of said frequency whereby said signal is also indicative of said force.

2. A system according to claim 1 in which said second means includes a corrector for selectively offsetting said signal to correspond to a predetermined offset force.

3. A system according to claim 1 in which said frequency has a value indicative of a predetermined force, and in which said third means includes counting means modulo M responsive to said frequency, whereby said unique force is categorized by a zero count modulo M.

4. A system for linearly measuring force comprising:
a pair of electrically conductive surfaces spaced apart by a distance responsive to said force;
   a resistance-capacitance oscillator connected to said surfaces for generating a first alternating electrical signal having a period linearly responsive to said distance;
   an electrical phase and amplitude positive feedback device coupled between said surfaces and said oscillator for neutralizing stray capacitance;
   a third means responsive to the output of said oscillator for generating an output signal having a characteristic linearly proportional to said force.

5. A system according to claim 4 in which said third means includes a digital counter for providing a numeric output signal categorizing said force.

6. A system according claim 5 in which said third means further includes a digital counter for subtracting a predetermined number from said numeric output signal.

7. A system according to claim 4 in which said third means includes a sequential counter responsive to said first electrical signal, and a controllable gate for providing a predetermined time interval during which said counter is active.

* * * * *